(12) United States Patent
Valentino

(10) Patent No.: US 9,063,237 B2
(45) Date of Patent: Jun. 23, 2015

(54) SPECT/PET IMAGING SYSTEM

(71) Applicant: KONINKLIJKE PHILIPS N.V., Eindhoven (NL)

(72) Inventor: Frank Charles Valentino, Solon, OH (US)

(73) Assignee: Koninklijke Philips N.V., Eindhoven (NL)

(*) Notice: Subject to any disclaimer, the term of this patent is extended or adjusted under 35 U.S.C. 154(b) by 0 days.

(21) Appl. No.: 14/396,077

(22) PCT Filed: Apr. 26, 2013

(86) PCT No.: PCT/IB2013/053305
§ 371 (c)(1),
(2) Date: Oct. 22, 2014

(87) PCT Pub. No.: WO2013/168043
PCT Pub. Date: Nov. 14, 2013

(65) Prior Publication Data
US 2015/0090891 A1    Apr. 2, 2015

Related U.S. Application Data

(60) Provisional application No. 61/644,082, filed on May 8, 2012.

(51) Int. Cl.
*G01T 1/20* (2006.01)
*G01T 1/202* (2006.01)
*G01T 1/208* (2006.01)
*G01T 1/29* (2006.01)
*G01T 1/16* (2006.01)
*G01T 1/164* (2006.01)

(52) U.S. Cl.
CPC ............ *G01T 1/2006* (2013.01); *G01T 1/1642* (2013.01); *G01T 1/2985* (2013.01); *G01T 1/2023* (2013.01); *G01T 1/208* (2013.01)

(58) Field of Classification Search
CPC ..... G01T 1/1603; G01T 1/161; G01T 1/1611; G01T 1/1615; G01T 1/2985; A61B 6/032; A61B 6/037; A61B 6/5235
USPC ........................................ 250/363.04; 378/4
See application file for complete search history.

(56) References Cited

U.S. PATENT DOCUMENTS 6,271,524 B1    8/2001  Wainer et al.
6,661,866 B1 * 12/2003  Limkeman et al. ............. 378/19
(Continued)

OTHER PUBLICATIONS

Delbeke, D., et al.; Rest Myocardial Perfusion/Metabolism Imaging Using Simultaneous Dual-Isotope Acquisition SPECT with Technetium-99m-MIBI/Fluorine-18-FDG; 1995; Journal of Nuclear Medicine; 36(11)2110-2119.

*Primary Examiner* — Mark R Gaworecki

(57) ABSTRACT

An imaging system includes a set of detector modules that detect gamma rays, which have energy in a range of 40 to 140 keV and 511 keV, emitted by a radioisotope in an examination region, wherein 511 keV gamma rays are detected in singles mode in which individual 511 keV gamma rays, and not coincidence pairs of 511 keV gamma rays, are detected, an energy discriminator that bins detected gamma rays into a first energy bin corresponding to 511 keV energy gamma rays and a second energy bin corresponding to 40 to 140 keV energy gamma rays, and a reconstructor that reconstructs the 511 keV energy gamma rays thereby generating a first image of a distribution of a first radionuclide and that reconstructs the gamma rays in the one or more ranges between 40 and 140 keV thereby generating a second image of a distribution of a second radionuclide.

20 Claims, 4 Drawing Sheets

(56) References Cited

U.S. PATENT DOCUMENTS

| | | |
|---|---|---|
| 7,138,635 B2 | 11/2006 | Heismann |
| 7,180,074 B1 * | 2/2007 | Crosetto ................ 250/370.09 |
| 2004/0195512 A1 * | 10/2004 | Crosetto ................ 250/363.04 |
| 2005/0253073 A1 | 11/2005 | Joram et al. |
| 2010/0268074 A1 | 10/2010 | Van Loef et al. |
| 2011/0237941 A1 | 9/2011 | Shahar et al. |
| 2011/0240864 A1 | 10/2011 | Degenhardt et al. |

* cited by examiner

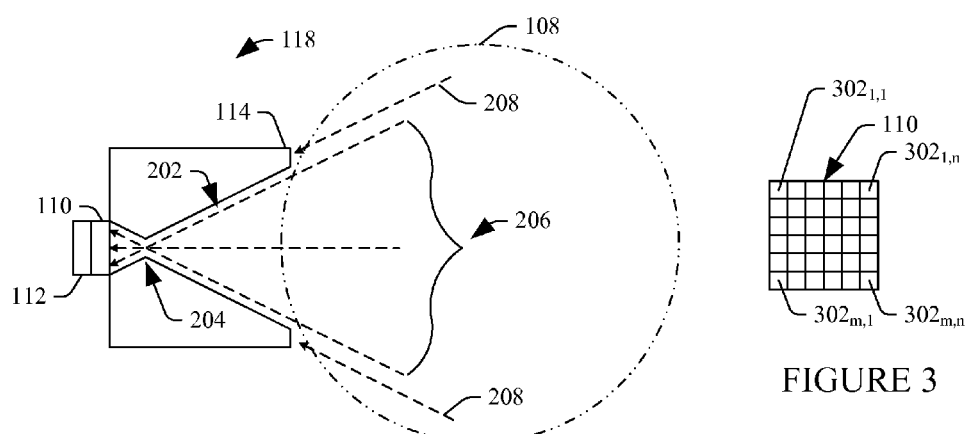
FIGURE 2
FIGURE 3
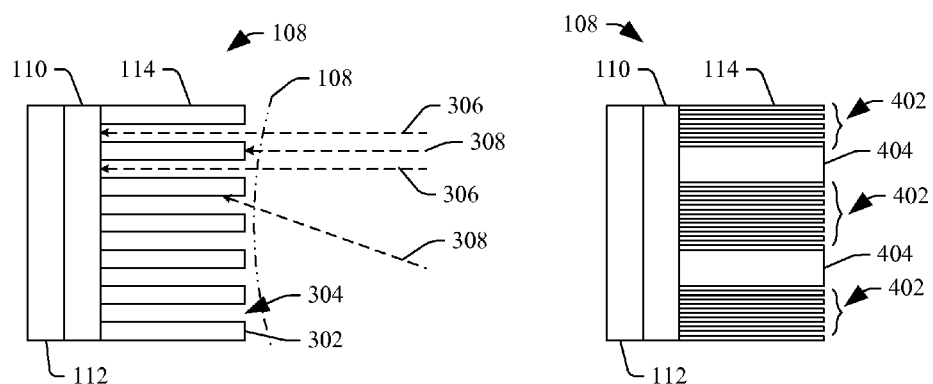
FIGURE 4
FIGURE 5

SPECT/PET IMAGING SYSTEM

CROSS REFERENCE TO RELATED APPLICATIONS

This application is a national filing of PCT application Serial No. PCT/IB2013/053305, filed Apr. 26, 2013, published as WO 2013/168043 A2 on Nov. 14, 2013, which claims the benefit of U.S. provisional application Ser. No. 61/644,082 filed May 8, 2012, which is incorporated herein by reference.

The present application relates to a single photon emission computed tomography (SPECT)/positron emission tomography (PET) imaging system.

A SPECT imaging system has included a gamma radiation detector and a collimator, which is disposed between an examination region and the gamma radiation detector. The collimator includes a plurality of radiation attenuating septa that only allow gamma radiation having a certain angle of incidence to reach the gamma detector. The gamma radiation detector has included a scintillator and an array of photomultiplier tubes (PMTs) and is configured to detect gamma rays having energy in the diagnostic energy range (e.g., 40 to 140 keV).

Projections are acquired from a number of angles with respect to the examination region by rotating the gamma radiation detector around the examination region. The projections are reconstructed to produce volumetric data representative of the distribution of the radioisotope emitting the gamma rays in the object or subject. The spatial resolution of the data varies as a function of the distance between the detector and an object or subject under examination region, and, generally, increases with decreasing distance between the detector and the object or subject. As such, the detector generally is positioned close to the subject or object under evaluation.

A PET scanner has included a ring of gamma radiation detectors arranged around an examination region and configured to detect 511 keV gamma rays indicative of electron-positron decays occurring in an examination region. The detector has included an array of scintillator crystals and corresponding PMTs. The scintillator crystals generate bursts of photons (typically in or near the visible light range) in response to receiving 511 keV gamma rays, with each burst typically including on the order of several hundreds to thousands of photons spread over a time period on the order of tens of nanoseconds (ns).

Most decays result in two 511 keV gamma rays emitted almost 180 degrees to each other. As such, modern day PET scanners localize the source along a line of response (LOR). The PMTs convert the photons into a corresponding electrical signal, and a coincidence event identifier identifies coincident gamma pairs by identifying photons detected in temporal coincidence (or near simultaneously). The identified pairs are used to generate data indicative of the spatial distribution of the decays. Photons pairs that do not arrive within a timing-window of a few nanoseconds are ignored.

SPECT scanners have included scintillators including thallium dope sodium iodide, or NaI(Tl). Such a material general has suitable light output efficiency, stopping power (density), and decay time (dead-time) to detect the emitted 40-140 keV SPECT gamma rays. In addition, SPECT scanners use collimators to obtain spatial information about the origin of detected gamma rays. In contrast, PET scanners have included scintillators including lutetium yttrium orthosilicate, or LYSO, which has lower light output efficiency relative to NaI(Tl) but higher density and thus higher good stopping power for the higher energy 511 keV PET gamma rays and faster decay times to measure PET coincidence events. PET scanners use coincidence detection (detection of 511 keV gamma ray pairs from each decay) to obtain spatial information about the origin of the annihilation events producing the gamma rays.

Aspects described herein address the above-referenced problems and others.

In one aspect, an imaging system includes a set of detector modules that detect gamma rays, which have energy in a range of 40 to 140 keV and 511 keV, emitted by a radioisotope in an examination region, wherein 511 keV gamma rays are detected in singles mode in which individual 511 keV gamma rays, and not coincidence pairs of 511 keV gamma rays, are detected, an energy discriminator that bins detected gamma rays into a first energy bin corresponding to 511 keV energy gamma rays and a second energy bin corresponding to 40 to 140 keV energy gamma rays, and a reconstructor that reconstructs the 511 keV energy gamma rays thereby generating a first image of a distribution of a first radionuclide and that reconstructs the gamma rays in the one or more ranges between 40 and 140 keV thereby generating a second image of a distribution of a second radionuclide.

In another aspect, a method includes operating an imaging system alternatively in SPECT or PET mode, acquiring SPECT or PET data, depending on the operating mode, with pixelated detector modules arranged in a ring around an examination region, wherein each module includes a collimator defining a gamma ray detection zone, and reconstructing the acquired data, thereby producing SPECT or PET image data.

In another aspect, a SPECT/PET imaging system includes a pixelated detector module (108) that detects gamma rays having energy in a range of 40 to 140 keV when in SPECT mode and only individual gamma rays having an energy approximately equal to 511 keV when in PET mode and a reconstructor that reconstructs the detected gamma rays, producing SPECT or PET images depending on the mode.

The invention may take form in various components and arrangements of components, and in various steps and arrangements of steps. The drawings are only for purposes of illustrating the preferred embodiments and are not to be construed as limiting the invention.

FIG. 1 schematically illustrates a SPECT/PET imaging system with a detector array that detects gamma rays having an energy in a range of 40 to 511 keV.

FIG. 2 schematically illustrates an example of the detector module of the system of FIG. 1.

FIG. 3 schematically illustrates an example crystal array of the detector module of FIG. 2.

FIG. 4 schematically illustrates another example of the detector module of the system of FIG. 1.

FIG. 5 schematically illustrates another example of the detector module of the system of FIG. 1.

FIG. 6 schematically illustrates a variation of the SPECT/PET imaging system of FIG. 1 in which at least one detector module translates and/or rotates.

Figure 1:
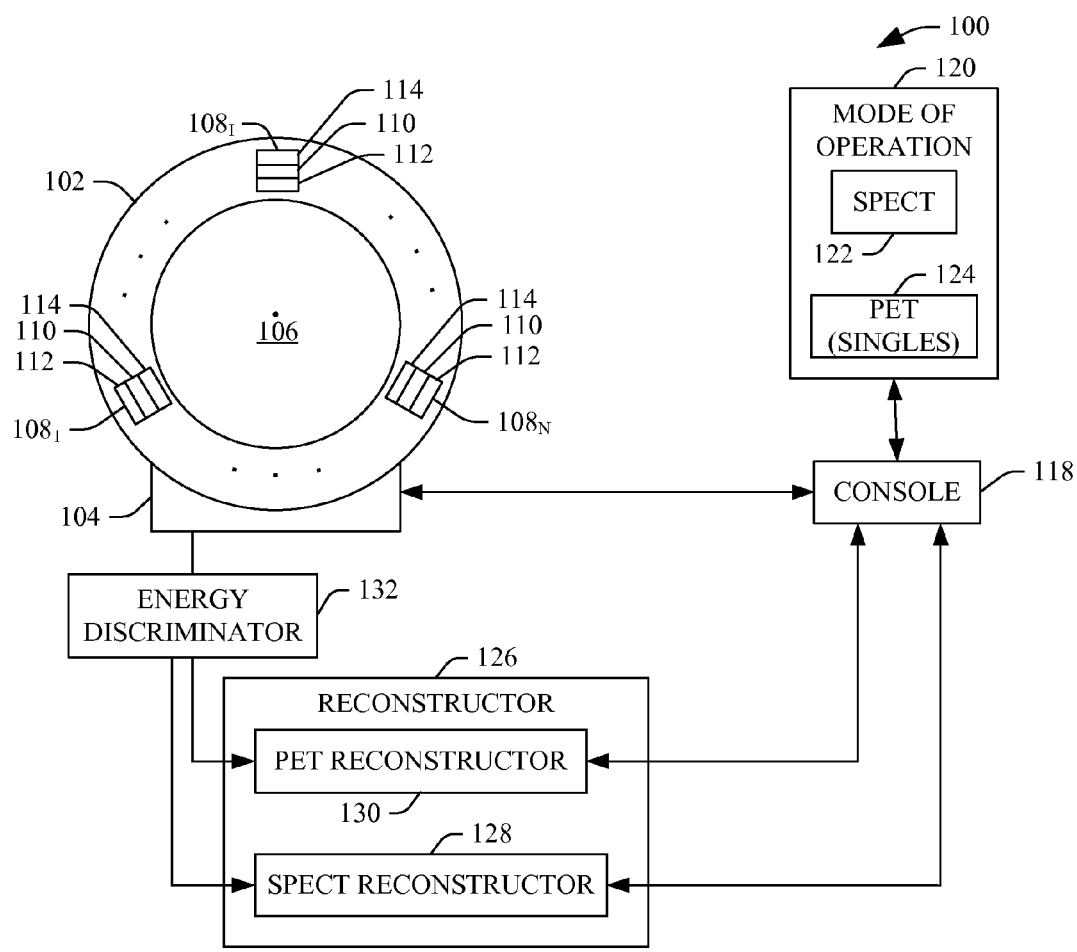

FIG. 1 schematically illustrates a SPECT/PET imaging system 100. The system 100 includes a closed annular ring 102 affixed to a base 104 and including an aperture (which is large enough for whole body scans) defining an examination region 106. A plurality of detector modules $108_1, \ldots, 108_I, \ldots, 108_N$ (collectively referred to herein as modules 108) are affixed to ring 102. The illustrated embodiment includes three (N=3) modules 108, angularly offset from each other around the ring by approximately one hundred and twenty degrees. In other embodiments, more or less of the modules 108 are affixed to the ring 102, equally or unequally spaced apart. Although only a single ring is shown, it is to be understood that the system 100 may include one or more such rings along the z direction.

Each detector module 108 includes a two-dimensional array of scintillator crystals 110 optically coupled to photosensor array 112 such as a pixelated silicon photomultiplier (SiPM). In the illustrated embodiment, the scintillator crystal 112 includes thallium-doped caesium iodide or CsI(Tl). CsI (Tl) has a higher light output efficiency relative to NaI(Tl), but a much lower decay time. However, the pixelated SiPM allows for lower decay times as individual pixels receiving photons are subject to the resulting dead-time and not a large area of the scintillator as with PMT configurations. CsI(Tl) also has suitable stopping power (density) for the gamma rays. The modules 108 detect radiation at least in a range from 40 keV to 511 keV and, thus, detect radiation for both SPECT imaging (e.g., 40 keV to 140 keV) and PET (e.g., approximately 511 keV) imaging.

A collimator 114 is affixed to each module 108. FIG. 2 shows an example collimator 114 with a fan shaped opening 202 or detection zone, which leads to a pinhole 204 (the size of which is shown for illustrative purposes) and the detector module 108. With this configuration, photons traversing a range of paths 206 pass from the examination region 108 through the pinhole 204 illuminate the scintillator crystals 110, and photons traversing paths 208 pass outside of the range 206 are attenuated by the collimator 114. FIG. 3 shows a view looking in at an example set of square shaped crystals 110. In other embodiments, the crystals 100 can be hexagonal, rectangular, octagonal, and/or otherwise shaped. A location of an origin of a photon illuminating the crystal 110 can be determined based on which crystal(s) $302_{1,1}, \ldots, 302_{1,n1}, \ldots, 302_{m,1}, \ldots, 302_{m,n}$ of the two-dimensional array of scintillator crystals 110 is illuminated.

FIG. 4 shows another example collimator 114. In this example, the collimator 114 includes a plurality of rectangular shaped septa 302, arranged to define a plurality of rectangular shaped openings 304 or detection zones (the size of which is shown for illustrative purposes). With this configuration, photons traversing paths 306 pass from the examination region 108 through an opening 304 illuminate the scintillator crystals 110, and photons traversing paths 308 incident on the septa 302 are attenuated by the collimator 114. Similarly, a location of an origin of a photon illuminating the crystal 110 can be determined based on which crystal(s) $302_{1,1}, \ldots, 302_{1,n1}, \ldots, 302_{m,1}, \ldots, 302_{m,n}$ of the two-dimensional array of scintillator crystals 110 is illuminated.

FIG. 5 illustrates an example hybrid collimator 114, which includes first septa 402 which provide high resolution for SPECT imaging interlaced with second more dense septa 404, which provides sufficient stopping power for PET imaging. Generally, the septa 402 are relatively thinner compared with the septa 404. In this configuration, each module 108 is configured for both SPECT and PET imaging. Collimators 114 with other detection zone shapes such as a cone detection zone and/or other detection zone are also contemplated herein.

In a variation, a first sub-set of the modules 108 are configured for only SPECT imaging and a second sub-set of the modules 108 are configured for only PET imaging. With this configuration, the modules 108 can be arranged on the annular ring 102 so that a module (or a pair, or a triplet, etc.) of the first sub-set is followed by a module (or a pair, or a triplet, etc.) of the second sub-set which is followed by a module (or a pair, or a triplet, etc.) of the first sub-set and so on. The scintillation material of the dedicated PET module can include CsI(Tl), thallium-doped sodium iodide or NaI(Tl), cerium doped lanthanum bromide or $LaBr_3(Tl)$, and/or other scintillation material. The data acquired using the dedicated PET module can be reconstructed in singles mode and/or in coincident detection mode.

It is to be appreciated that different collimators can be automatically and/or manually interchangeably used to vary the collimation. In addition, different collimators may be used to define different shaped detection zones.

Returning to FIG. 1, a general purpose computer serves an operator console 118. The console 118 includes a human-readable output device such as a monitor or display and an input device such as a keyboard and mouse. Software resident on the console 118 allows the operator to control the operation of the scanner. This includes identifying a mode of operation 120, including at least one of a SPECT 122 mode of operation or a PET 124 mode of operation. That is, the system 100 can be run in the SPECT mode 122 in which a conventional or other SPECT scan is performed, a PET (singles) mode 124 in which single 511 keV gamma rays (and not pairs of coincidence 511 keV gamma rays) are detected, or a combination of SPECT and PET modes 122 and 124 in which SPECT and PET are performed concurrently.

A reconstructor 126 includes a SPECT reconstructor 128 that reconstructs the acquired SPECT data and a PET reconstructor 130 that reconstructs the acquired PET data. An energy discriminator 132 can be used to energy discriminate detected photons into different energy bins to separate the data for concurrent SPECT and PET scans.

Figure 6:
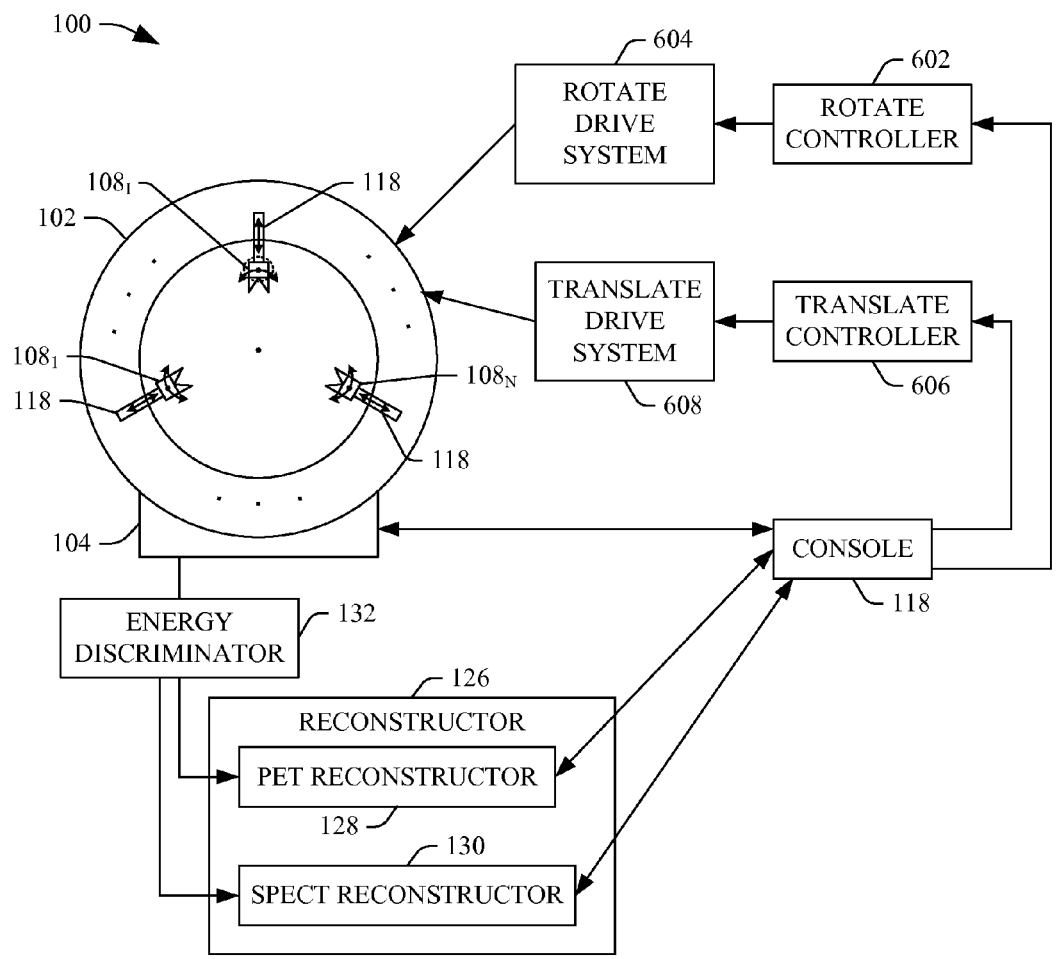

FIG. 6 schematically illustrates a variation of the SPECT/PET imaging system 100 in which the modules 108 are moveably affixed to the annular ring 102. In this example, at least one of the modules 108 is translatably affixed to the ring 102 via a member 118 and is configured translate radially towards and away from the examination region 106. For SPECT, spatial resolution increases as a function of decreasing distance between the module 108 and the subject or object. For PET, detection location accuracy increases as a function of increasing distance between the module 108 and the subject or object. Alternatively or additionally, at least one of the modules 108 is rotatably affixed to the ring 102 and is configured to rotate through an arc, sweeping the detection zone to create a zone of interest. A rotate controller 602 controls a rotate drive system 604 that rotates the modules 108 and a translate controller 606 that controls a translate drive system 608 that translates the module 108.

Figure 7:
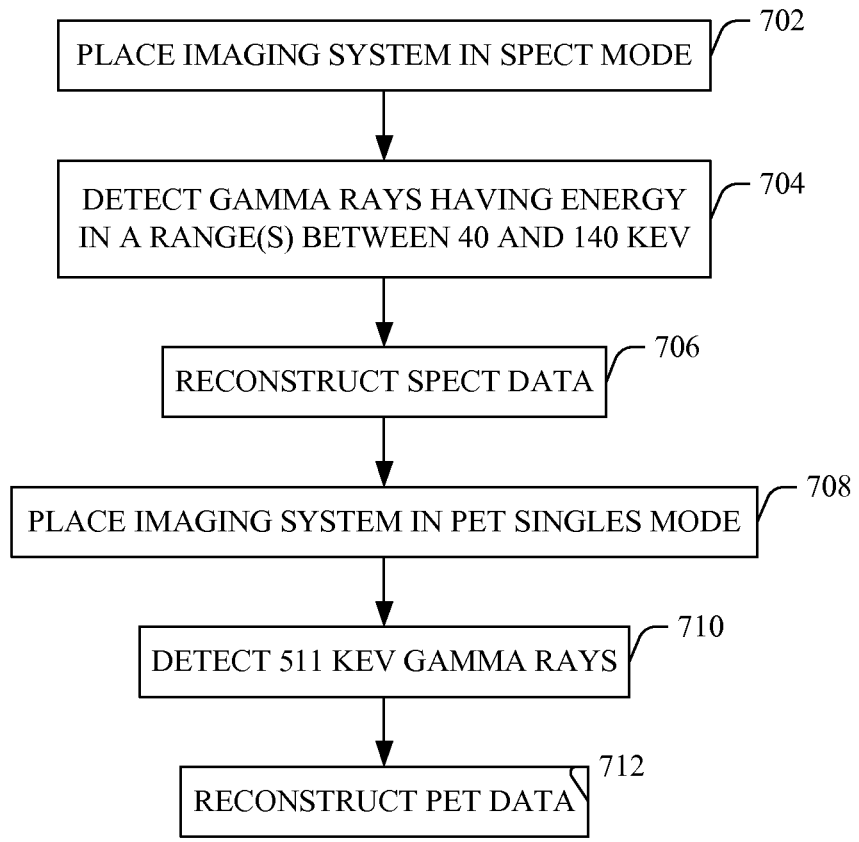
FIG. 7 illustrates an example method in accordance with the system described herein.

FIG. 7 illustrates an example method.

At 702, an imaging system is placed in SPECT mode.

At 704, a detector modules detect gamma rays having an energy in a range(s) between 40 to 140 keV emitted from a radio-isotope in a subject or object in the examination region.

At 706, the detected gamma rays are reconstructed, thereby generating SPECT image data indicative of distribution of the radio-isotope in the subject or object.

At 708, the imaging system is placed in PET singles mode.

At 710, the detector modules detect individual gamma rays having an energy of approximately 511 keV emitted from a different radio-isotope in a subject or object in the examination region.

As discussed herein, the detector modules may include individual models that detect both 40 to 140 keV and 511 keV gamma rays and/or individual models that detect only 40 to 140 keV or 511 keV gamma rays.

At 712, the detected gamma rays are reconstructed, thereby generating PET data indicative of distribution of the radio-isotope in the subject or object.

Figure 8:
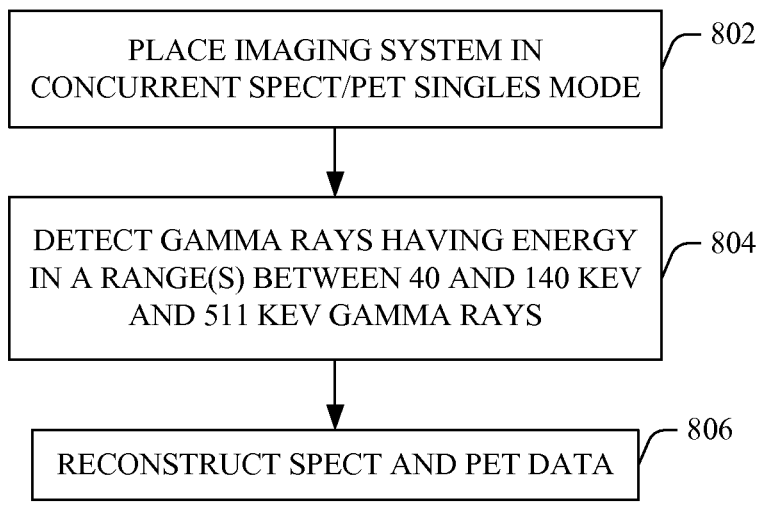
FIG. 8 illustrates another example method in accordance with the system described herein.

FIG. 8 illustrates an example method.

At 802, an imaging system is placed in concurrent SPECT/PET singles mode.

At 804, a detector modules detect gamma rays having an energy in a range(s) between 40 to 140 keV emitted from a radio-isotope in a subject or object in the examination region and detects individual gamma rays having an energy of approximately 511 keV emitted from a different radio-isotope in a subject or object in the examination region.

As discussed herein, the detector modules may include individual models that detect both 40 to 140 keV and 511 keV gamma rays and/or individual models that detect only 40 to 140 keV or 511 keV gamma rays.

At 806, the detected 40 to 140 keV gamma rays are reconstructed, thereby generating SPECT image data indicative of distribution of the radio-isotope in the subject or object, and the detected 511 keV gamma rays are reconstructed, thereby generating PET data indicative of distribution of the radio-isotope in the subject or object.

It is to be appreciated that the ordering of the above acts is not limiting. As such, other orderings are contemplated herein. In addition, one or more acts may be omitted and/or one or more additional acts may be included.

The above may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. An imaging system, comprising:
    a closed annular ring with an aperture defining an examination region;
    a set of detector modules affixed to the closed annular ring, wherein the set of detector modules detect gamma rays, which have energy in a range of 40 to 140 keV and 511 keV, emitted by a radioisotope in an examination region, wherein 511 keV gamma rays are detected in singles mode in which individual 511 keV gamma rays, and not coincidence pairs of 511 keV gamma rays, are detected;
    an energy discriminator that bins detected gamma rays into a first energy bin corresponding to 511 keV energy gamma rays and a second energy bin corresponding to 40 to 140 keV energy gamma rays; and
    a reconstructor that reconstructs the 511 keV energy gamma rays in the first energy bin thereby generating a first image of a distribution of a first radionuclide and that reconstructs the 40 to 140 keV energy gamma rays in the second energy bin thereby generating a second image of a distribution of a second radionuclide.

2. The imaging system of claim 1, wherein the set includes a single detector module configured to detect both 40 to 140 keV and 511 keV gamma rays.

3. The imaging system of claim 1, wherein the set includes a first sub-set of detector modules configured to detect only 40 to 140 keV gamma rays and a second sub-set of detector modules configured to detect only 511 keV gamma rays.

4. The imaging system of claim 1, further comprising:
    a collimator that defines a radiation detection zone for a module.

5. The imaging system of claim 4, wherein the detection zone is one of fan, cone shaped.

6. The imaging system of claim 1, the detector module, comprising:
    a scintillator, including at least one thallium-doped cesium iodide scintillation crystal.

7. The imaging system of claim 1, the detector module, comprising:
    a scintillator, including at least one lanthanum bromide scintillation crystal.

8. The imaging system of claim 7, wherein at least one of the scintillator further includes at least one thallium-doped sodium iodide scintillation crystal.

9. The imaging system of claim 1, wherein the detector module is configured to translate radially towards and away from the examination region.

10. The imaging system of claim 1, wherein the detector module is configured to rotate through an arc to sweep a detection zone across the examination region.

11. The imaging system of claim 1, further comprising:
    a collimator that defines a radiation detection zone for a module, wherein the detection zone is rectangular shaped.

12. The imaging system of claim 1, wherein the set of detector modules includes three detector modules.

13. The imaging system of claim 1, further including more than one of the closed annular ring along a z-direction.

14. The imaging system of claim 1, wherein the set of detector modules detect gamma rays, which have energy of 511 keV, emitted by a radioisotope in an examination region, wherein 511 keV gamma rays are detected in a mode in which coincidence pairs of 511 keV gamma rays, are detected.

15. A method, comprising:
    operating an imaging system, which includes a ring of detector modules defining an examination region in SPECT mode and PET singles mode to detect gamma rays having an energy from 40 to 140 keV and 511 keV;
    acquiring SPECT and PET data, with pixelated detector modules arranged in a ring around an examination region, wherein each module includes a collimator defining a gamma ray detection zone; and
    reconstructing the acquired data, thereby producing SPECT and PET image data.

16. The method of claim 15, further comprising:
    radially translating each module towards and away from the subject or object to scanning position.

17. The method of claim 15, further comprising:
    rotating each module through an arc while collecting data during scanning.

18. The method of claim 15, further comprising:
    energy binning the acquired data based on a predetermined set of energy ranges of interest; and
    selectively reconstructing acquired data corresponding to an energy range of interest.

19. The method of claim 15, wherein PET data is acquired in singles mode in which individual 511 keV gamma rays, and not coincidence pairs, are acquired and reconstructed.

20. A SPECT/PET imaging system, comprising:
    a pixelated detector module of an annular detector ring that detects gamma rays having energy in a range from 40 to 140 keV and 511 keV; and a reconstructor that reconstructs the detected gamma rays, producing SPECT or PET images respectively depending on whether a mode of is a SPECT mode or a PET singles mode.

* * * * *